United States Patent
Perlin

(10) Patent No.: US 6,263,755 B1
(45) Date of Patent: Jul. 24, 2001

(54) ROBOTIC MANIPULATOR AND METHOD

(75) Inventor: Kenneth Perlin, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 09/248,500

(22) Filed: Feb. 10, 1999

(51) Int. Cl.⁷ .............................. B25J 17/00; B25J 17/02; B25J 18/00
(52) U.S. Cl. .................... 74/490.01; 74/490.05; 74/490.03
(58) Field of Search ............. 74/490.01, 490.3, 74/490.5, 490.6, 490.7, 490.8

(56) References Cited

U.S. PATENT DOCUMENTS

| Re. 35,584 | 8/1997 | Sonoda et al. . | |
|---|---|---|---|
| 4,911,033 | * 3/1990 | Rosheim et al. | 74/479 |
| 5,656,905 | * 8/1997 | Tsai | 318/568.21 |
| 5,816,105 | * 10/1998 | Adelstein | 74/471 XY |
| 5,823,061 | 10/1998 | Tomiyasu . | |
| 5,881,604 | 3/1999 | Miwa . | |
| 5,901,613 | * 5/1999 | Forslund | 74/490.3 |
| 6,047,610 | 4/2000 | Stocco et al. . | |

* cited by examiner

Primary Examiner—Sherry Estremsky
Assistant Examiner—Tisha D. Lewis
(74) Attorney, Agent, or Firm—Ansel M. Schwartz

(57) ABSTRACT

A robotic manipulator. The manipulator includes an end. The manipulator includes a drive limb comprising N concentrically nested tubes, where N is greater than or equal to 2 and is an integer. The limb has a top and a bottom and is connected to the end at the top of the limb. The manipulator includes a drive mechanism connected with the drive limb at the drive limb's bottom to move the limb and the end. A method for moving a robotic manipulator. The method includes the steps of rotating an outside concentric tube of a drive limb. Then there is the step of turning a support structure of a joint with the outside tube which contacts the support structure. Next there is the step of rotating a second limb with an axle which contacts the second limb and the support structure to cause the second limb to rotate about the gear.

14 Claims, 6 Drawing Sheets

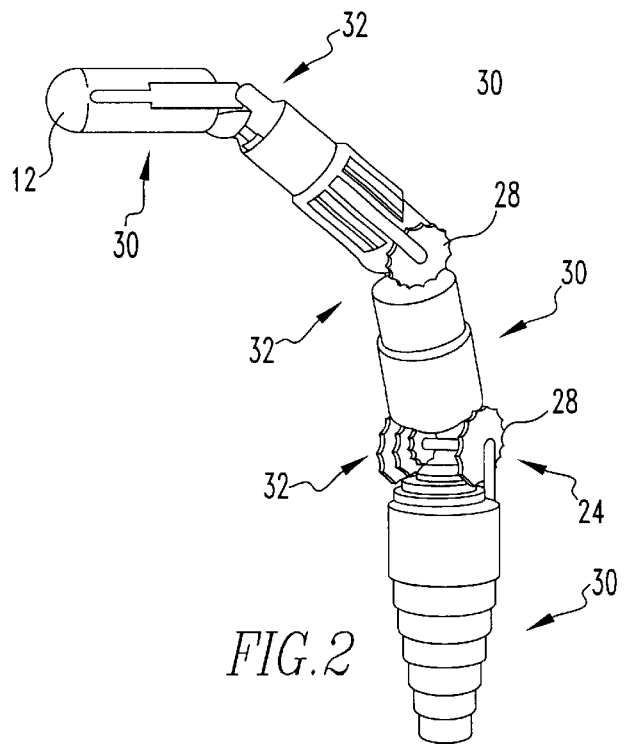
*FIG.2*
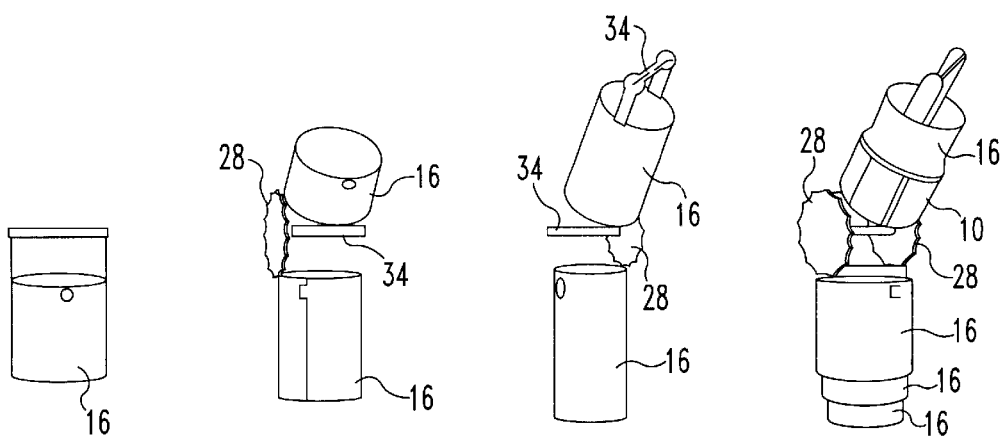
*FIG.3a*  *FIG.3b*  *FIG.3c*  *FIG.3d*

ROBOTIC MANIPULATOR AND METHOD

FIELD OF THE INVENTION

The present invention is related to robotic manipulators having a plurality of limbs connected by joints. More specifically, the present invention is related to robotic manipulators having a plurality of limbs connected by joints where the limbs comprise nested tubes.

BACKGROUND OF THE INVENTION

There are a number of desirable properties for robotic manipulators, and it is difficult to achieve all of these at the same time:
no backslip
direct drive
rigid construction
hollow cavity to transport tubing and electrical cables
light weight
statically mounted motors
simple mechanism
high scalability The present invention satisfies all of these constraints. It does this by using a novel drive mechanism, which transmits multiple degrees of freedom of movement through a series of N concentrically arranged hollow tubes. All mechanical movement from one stage is embodied in the relative rotation about a common central axis of these tubes, which can also provide mechanical support. The drive power of any given tube is either:
used to rotate or bend the next stage, or
transmitted to a system of concentric tubes that forms the next stage This process is continued in a succession of stages, until all N degrees of freedom have been used.

SUMMARY OF THE INVENTION

The present invention pertains to a robotic manipulator. The manipulator comprises an end. The manipulator comprises a drive limb comprising N concentrically nested tubes, where N is greater than or equal to 2 and is an integer. The limb has a top and a bottom and is connected to the end at the top of the limb. The manipulator comprises a drive mechanism connected with the drive limb at the drive limb's bottom to move the limb and the end.

The present invention pertains to a method for moving a robotic manipulator. The method comprises the steps of rotating an outside concentric tube of a drive limb. Then there is the step of turning a support structure of a joint with the outside tube which contacts the support structure. Next there is the step of rotating a second limb with an axle which contacts the second limb and the support structure to cause the second limb to rotate about the gear.

BRIEF DESCRIPTION OF THE DRAWINGS

In the accompanying drawings, the preferred embodiment of the invention and preferred methods of practicing the invention are illustrated in which:

FIG. 2 is schematic representation of a perspective view of the manipulator of the present invention.

FIG. 3 is an exploded view of stage 1 and part of stage 2, demonstrating the two degrees of freedom effected by stage 1. The three images on the left are, respectively, these three components. The image on the right shows these components all assembled into the Mechanism.

DETAILED DESCRIPTION

Figure 1:
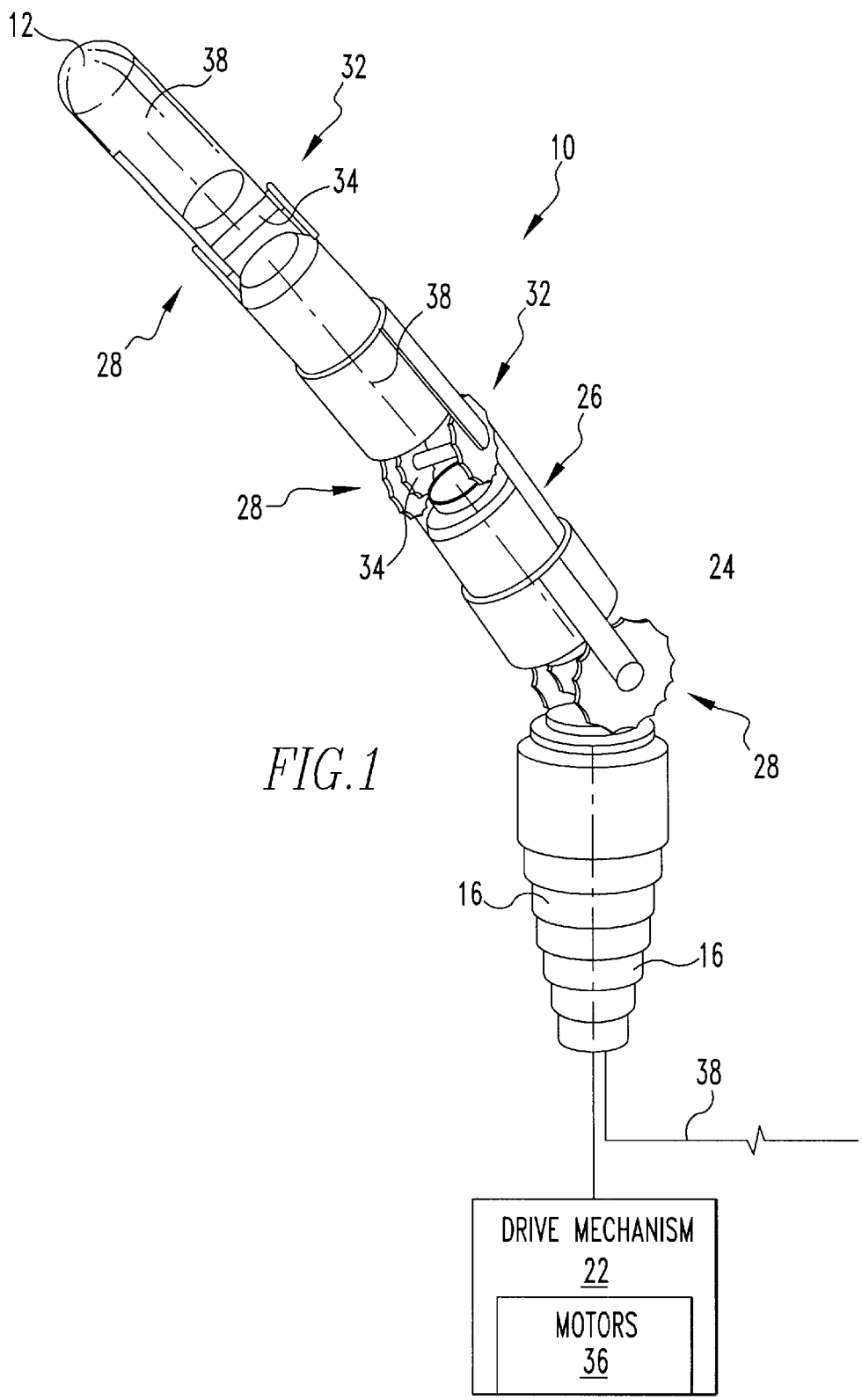
FIG. 1 is a schematic representation of a perspective view of the manipulator of the present invention.

Referring now to the drawings wherein like reference numerals refer to similar or identical parts throughout the several views, and more specifically to FIG. 1 thereof, there is shown a robotic manipulator 10. The manipulator 10 comprises an end 12.

The manipulator 10 comprises a drive limb 14 comprising N concentrically nested tubes 16, where N is greater than or equal to 2 and is an integer. The limb has a top and a bottom and is connected to the end 12 at the top of the limb. The manipulator 10 comprises a drive mechanism 22 connected with the drive limb 14 at the drive limb's 14 bottom to move the limb and the end 12.

Preferably, each tube 16 of the limb that is nested in another tube 16 is longer than the tube 16 which surrounds it. The manipulator 10 preferably includes a first joint 24 having a top and a bottom. The joint's top is connected to the drive limb's 14 bottom. The manipulator 10 preferably includes a second limb 26 comprising N−2 concentrically arranged tubes 16. The second limb 26 has a top and a bottom. The top of the second limb 26 is in communication with the end 12, and the bottom of the second limb 26 is connected to the top of the joint.

Preferably, the drive limb 14 rotates or bends the second limb 26. The first joint 24 preferably comprises a plurality of gears 28 that contact the respective tubes 16 of the drive limb 14, except for the outermost tube 16 of the drive limb 14, and the respective tubes 16 of the second limb 26. As each respective tube 16 of the drive limb 14 rotates, it causes its respective gear to rotate, which in turn drives the respective tube 16 of the second limb 26 to rotate.

Preferably, the first joint 24 has two degrees of freedom, the first degree of freedom being a twisting rotation and the second degree of freedom being a bending rotation. The two degrees of freedom are preferably driven by the two outermost tubes 16 of the drive limb 14.

Preferably, the manipulator 10 includes N/2 successive limbs 30, where N is greater than or equal to four, to the drive limb 14, and a total of N/2 joints 32, each having 2 degrees of freedom, connecting the successive limbs 30 to each other. Each joint preferably comprises a support structure, and an axle 34 mounted to the support structure. Preferably, two successive limbs 30 form a set of limbs 30 and including a bearing disposed between each set of successive tubes 16.

The drive mechanism 22 preferably includes N external driving motors 36, each connected to a corresponding tube 16 of the drive limb 14.

Preferably, the driving motors 36 are arranged statically at the bottom of the drive limb 14. The drive limb 14 preferably does not support the drive motors 36. Preferably, the tubes 16 are hollow. The manipulator 10 preferably includes cables 38 disposed in and extending through the limbs 30 and connected to the end 12.

The present invention pertains to a method for moving a robotic manipulator 10. The method comprises the steps of rotating an outside concentric tube 16 of a drive limb 14. Then there is the step of turning a support structure of a joint with the outside tube 16 which contacts the support structure. Next there is the step of rotating a second limb 26 with an axle 34 which contacts the second limb 26 and the support structure to cause the second limb 26 to rotate about the gear.

Preferably, after the step of rotating the outside tube 16 of the drive limb 14 there are the steps of rotating a nested concentric tube 16 surrounded by the outside tube 16 of the drive limb 14. Then there is the step of turning a gear with the nested tube 16 which contacts the gear. Next there is the step of rotating a nested concentric tube 16 of the second limb 26 with the gear which contacts the second nested tube 16 to cause the nested tube 16 to bend about the gear.

In the operation of the preferred embodiment, the manipulator 10 consists of a sequence of joints 32, connected to one another by limbs 30 each of which is a set of concentric tubes FIG. 1 is a schematic representation of a perspective view of the manipulator 10 of the present invention.

The pieces are:

a set of external driving motors 36, a set of limbs 30, ie: sets of concentric hollow rigid tubes 16, low friction bearings, one between each pair of successive limbs 30, at each joint, mounted on each such support structure, an axle 34 at each joint, a set of no-backslip gears 28. For each tube 16 of the limb preceding the joint which is nested inside some other tube 16, there is a corresponding gear.

Each tube 16 that is nested inside another tube 16 is slightly longer than the tube 16 which surrounds it. This length difference creates a contact area between that nested tube 16 and its corresponding gear.

At each joint, there can be two degrees of freedom: a twisting rotation, followed by a bending rotation. These movements are driven by the two outermost tubes 16 of the limb preceding that joint. For this reason, if any limb contains n concentrically nested tubes 16, then the following limb will consist of n−2 concentrically nested tubes 16, where each tube 16 corresponds to one of the n−2 innermost tubes 16 of the preceding limb.

At its base, the manipulator 10 contains N concentrically nested tubes 16, then the complete mechanism can consist of N/2 successive limbs 30, each of which can be rotated with 2 degrees of freedom.

At each limb other than the final limb, the outer tube 16 rotates the support structure, which in turn causes the axle 34 to rotate about the central axis of that limb. Every tube 16 other than the outer tube 16 drives one gear.

The outermost nested tube 16 (ie: the tube 16 nested just inside the outermost tube 16) drives a gear which is rigidly connected to a sleeve that surrounds the next limb. When this tube 16 rotates, it causes the gear to rotate, which forces the next limb to be rotated about the axle 34 at the joint.

All other successively nested tubes 16 cause their corresponding gears 28 to rotate, which in turn drives the nested tubes 16 at the next joint to rotate.

The important aspects of the manipulator 10 from the user's point of view are:

The links are extremely precisely controllable and back-drivable. That is, if force is applied to the end effector, that force is transmitted directly back to the motors 36. This is not the case with conventional gear links. This means that the finger can manipulate different materials (softer or harder) while applying differing amounts of pressure.

The motors 36 can all be arranged statically at the base of the mechanism—the driving motors 36 do not need to move. This allows the mechanism to be very stiff and have very low inertia, since the moving parts to not need to bear any motors 36 as part of the load. It also means that more powerful and less expensive motors 36 can be employed, since they do not need to be optimized for low mass.

The mechanism is hollow. This allows various cables 38 and tubing to pass through the inside of the mechanism to the end effector, if desired.

In the preferred embodiment, the effector has six degrees of freedom, comprised of three stages, each stage effecting two degrees of freedom. These degrees of freedom are labeled 1a, 1b, 2a, 2b, 3a and 3b, respectively. Each stage effects first a twist about the central axis, followed by a bend perpendicular to the central axis.

Figure 9:
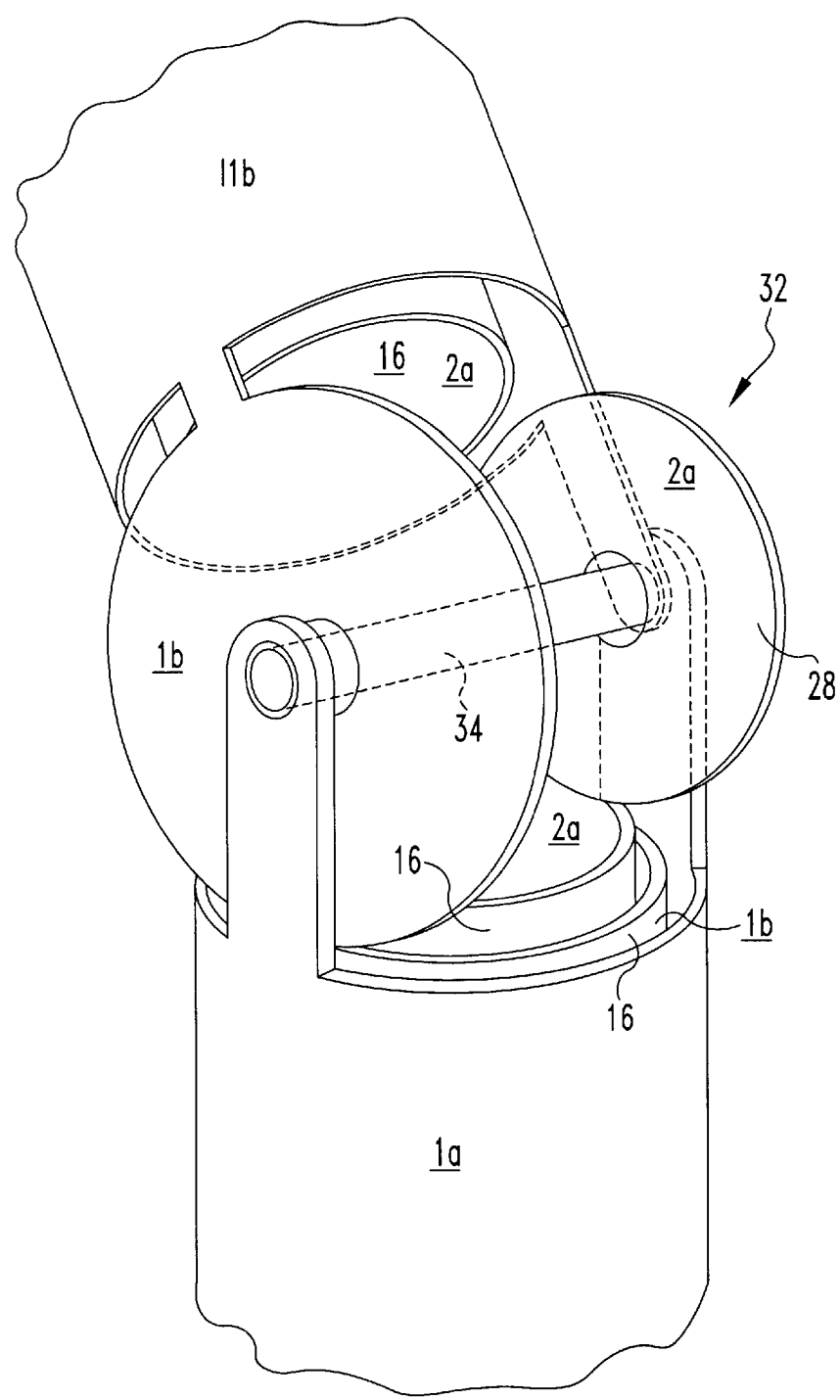
FIG. 9 is a schematic representation of a joint.

The successive stages are jointed as nested tubes 16 of progressively smaller radius, 1b being nestable inside 1a, 2a being nestable inside 1b, and so forth. Where each such pair of tubes 16 join they are separated by a low friction rotationally sliding joint, as shown in FIG. 9. Each such joint can be implemented by a teflon coating, or by an annular ring ball bearing, or by any other standard mechanism for enabling nested tubes 16 to be supported while remaining free to rotate one within the other.

FIG. 2 is a view of the complete mechanism, coded as follows:

Stage 1, effector for degree of freedom 1a
Stage 1, effector for degree of freedom 1b
Stage 2, effector for degree of freedom 2a
Stage 2, effector for degree of freedom 2b
Stage 3, effector for degree of freedom 3a
Stage 3, effector for degree of freedom 3b

FIG. 3 is an exploded view of stage 1 and part of stage 2, demonstrating the two degrees of freedom effected by stage 1. The three images on the left are, respectively, these three components. The image on the right shows these components all assembled into the mechanism.

Figure 4:
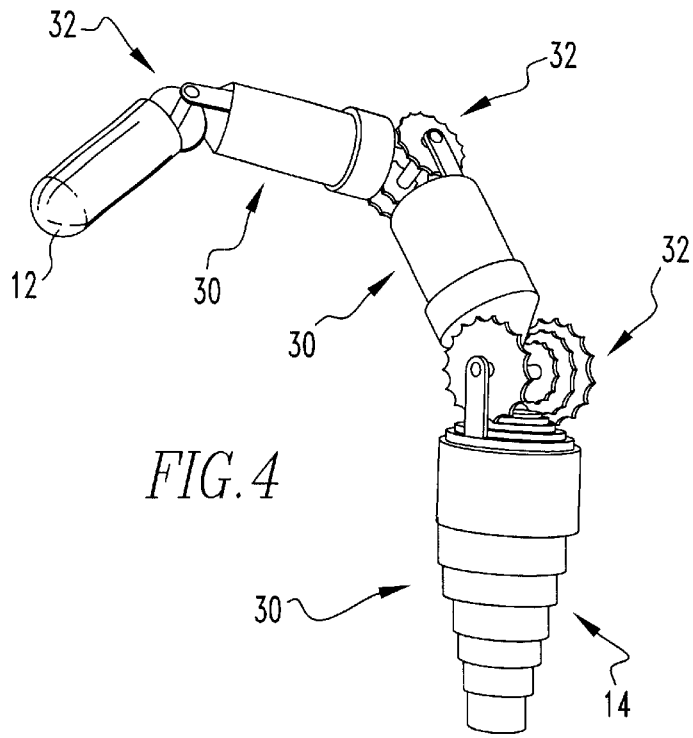
FIG. 4 shows a finger with six degrees of freedom.

FIG. 4 shows a finger with six degrees of freedom.

Figure 5:
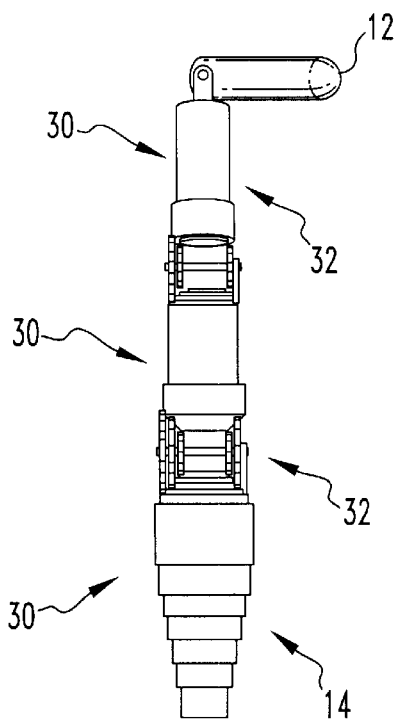
FIG. 5 shows the same finger with 90° rotation for last two degrees of freedom.

FIG. 5 shows the same finger with 90° rotation for last two degrees of freedom.

Figure 6:
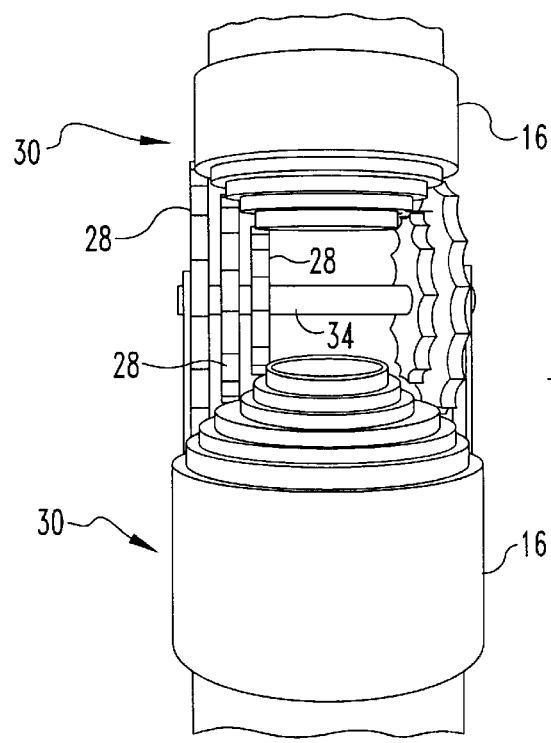
FIG. 6 shows a close-up of the first joint, in neutral position.

FIG. 6 shows a close-up of the first joint 24, in neutral position.

Figure 7:
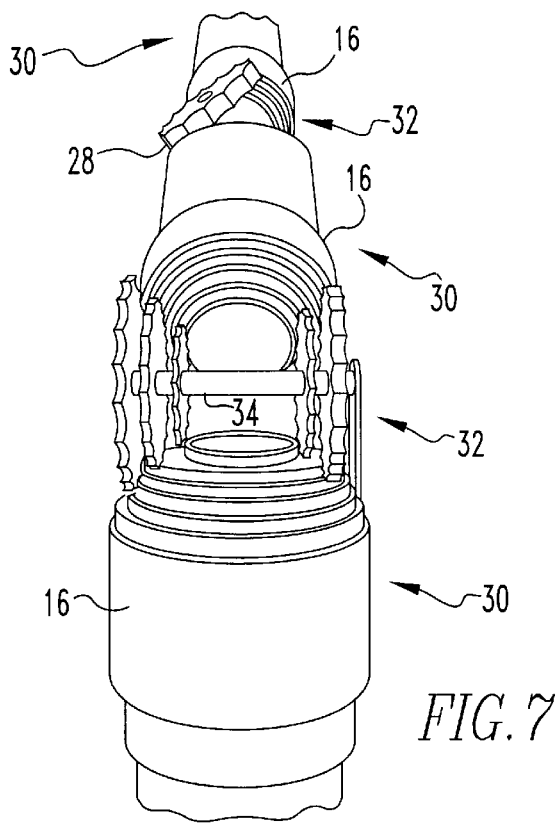
FIG. 7 shows a close-up of the first joint, with rotation in second degree of freedom (bending of first joint) Note the twisting in later joints, due to coupled rotation in later degrees of freedom.

FIG. 7 shows a close-up of the first joint 24, with rotation in second degree of freedom (bending of first joint 24). Note the twisting in later joints 32, due to coupled rotation in later degrees of freedom.

Figure 8:
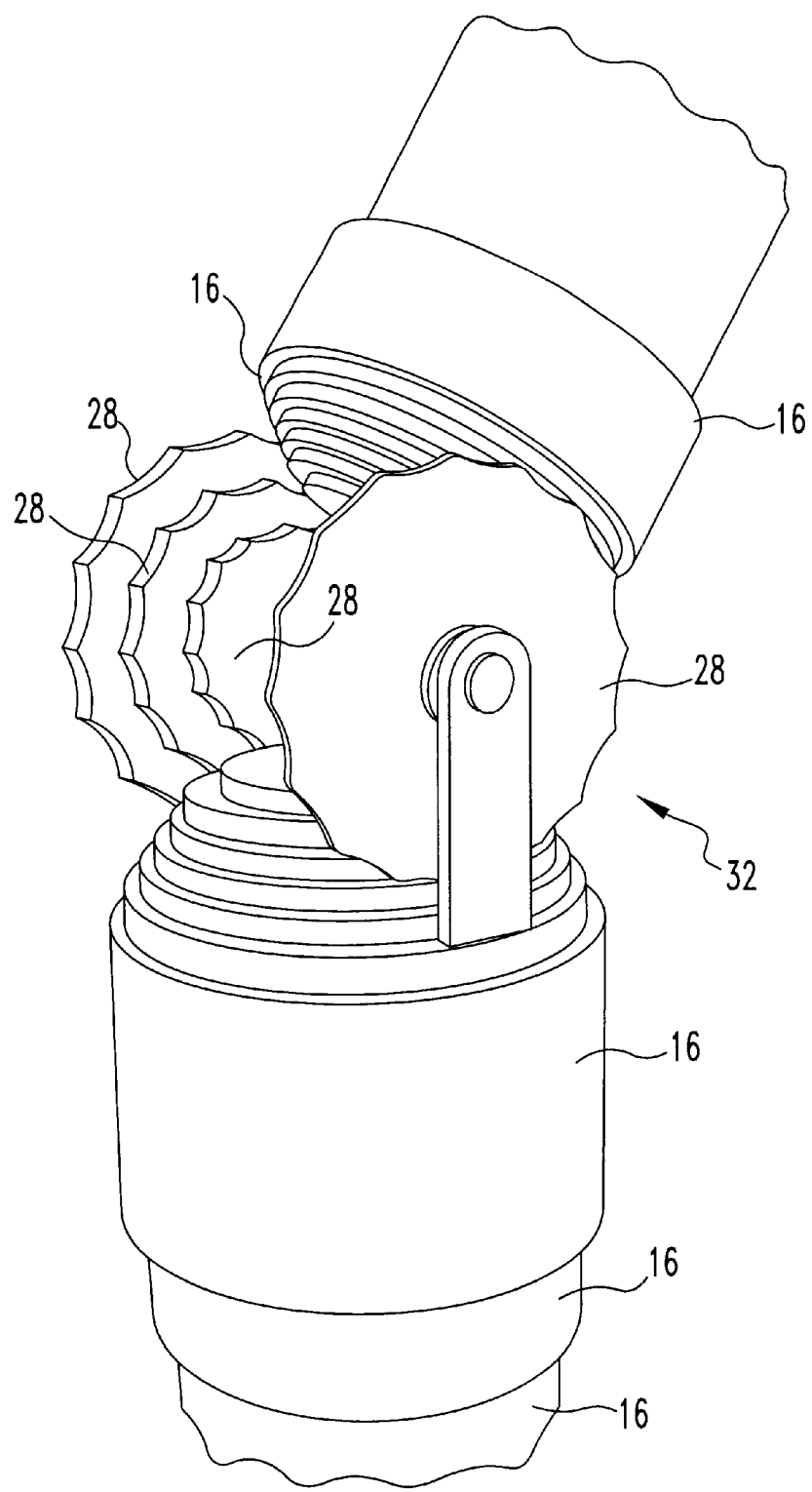
FIG. 8 shows a close-up of first joint, with rotation in first degree of freedom (twisting at first joint) . Note the bending at first joint, due to coupling between the first and second degrees of freedom.

FIG. 8 shows a close-up of first joint 24, with rotation in first degree of freedom (twisting at first joint 24). Note the bending at first joint 24, due to coupling between the first and second degrees of freedom.

FIG. 9 is a schematic representation of a joint.

Nesting of the concentric shafts:

Each pair of concentric rotating drive shafts is separated by a low friction rotational bearing. One possible embodiment of this consists of two or more ring joints, each positioned at a different location along the common central axis of the two drive shafts.

Each ring joint can be embodied as two parts:

(1) a ring extending inward from the inner wall of the outer hollow shaft, which is coated with a low friction material such as teflon, in contact (2) with a ring extending outward from the outer wall of the inner shaft, which is also coating with a low friction material.

Alternatively, each ring joint can be embodied as a rotational ball bearing, consisting of an outer ring, and an inner ring, and also a set of rotating balls spaced at regular angular intervals in the circular region separating the two rings, each ball being in contact with both rings (which is well known in prior art).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A robotic manipulator comprising:
   an end;
   a drive limb comprising N concentrically nested tubes, where N is greater than or equal to 2 and is an integer, said limb having a top and a bottom and connected to said end at the top of the limb, each tube of the limb that is nested in another tube is longer than the tube which surrounds it; and
   a drive mechanism connected with the drive limb at the drive limb's bottom to move the limb and the end.

2. A manipulator as described in claim 1 including a first joint having a top and a bottom, said first joint's top connected to the drive limb's bottom, and a second limb comprising N−2 concentrically arranged tubes, said second limb having a top and a bottom, said top of the second limb in communication with the end, and said bottom of the second limb connected to the top of the first joint.

3. A manipulator as described in claim 2 wherein the drive limb rotates or bends the second limb.

4. A manipulator as described in claim 3 wherein the first joint comprises a plurality of gears that contact the respective tubes of the drive limb, except for the outermost tube of the drive limb, and the respective tubes of the second limb; as each respective tube of the drive limb rotates, it causes its respective gear to rotate, which in turn drives the respective tube of the second limb to rotate.

5. A manipulator as described in claim 4 wherein the first joint has two degrees of freedom, the first degree of freedom being a twisting rotation and the second degree of freedom being a bending rotation.

6. A manipulator as described in claim 5 wherein the two degrees of freedom are driven by the two outermost tubes of the drive limb.

7. A manipulator as described in claim 6 including N/2 successive limbs, where N is greater than or equal to four, to the drive limb, and a total of N/2 joints, each having 2 degrees of freedom, connecting the successive limbs to each other.

8. A manipulator as described in claim 7 wherein each joint comprises a support structure, and an axle mounted to the support structure.

9. A manipulator as described in claim 8 wherein two successive limbs form a set of limbs and including a bearing disposed between each set of successive tubes.

10. A manipulator as described in claim 9 wherein the drive mechanism includes N external driving motors, each connected to a corresponding tube of the drive limb.

11. A manipulator as described in claim 10 wherein the driving motors are arranged statically at the bottom of the drive limb.

12. A manipulator as described in claim 11 wherein the drive limb does not support the drive motors.

13. A manipulator as described in claim 12 wherein the tubes are hollow.

14. A manipulator as described in claim 13 including cables disposed in and extending through the limbs and connected to the end.

* * * * *